United States Patent
Chen et al.

(10) Patent No.: US 10,268,001 B2
(45) Date of Patent: Apr. 23, 2019

(54) OPTICAL COMMUNICATION MODULE

(71) Applicant: ORANGETEK CORPORATION, Changhua County (TW)

(72) Inventors: Chun-Chieh Chen, Changhua County (TW); Chao-Hui Kuo, Changhua County (TW); Chun-Yi Yeh, Changhua County (TW); Guan-Fu Lu, Changhua County (TW)

(73) Assignee: Orangetek Corporation, Changhua (TW)

( * ) Notice: Subject to any disclaimer, the term of this patent is extended or adjusted under 35 U.S.C. 154(b) by 0 days.

(21) Appl. No.: 15/707,112

(22) Filed: Sep. 18, 2017

(65) Prior Publication Data
US 2019/0086619 A1  Mar. 21, 2019

(51) Int. Cl.
G02B 6/42 (2006.01)
G02B 6/43 (2006.01)
G02B 27/30 (2006.01)

(52) U.S. Cl.
CPC ......... *G02B 6/4204* (2013.01); *G02B 6/4214* (2013.01); *G02B 6/43* (2013.01); *G02B 27/30* (2013.01); *G02B 6/428* (2013.01)

(58) Field of Classification Search
CPC .................................................. G02B 6/4214
See application file for complete search history.

(56) References Cited

U.S. PATENT DOCUMENTS

| 9,429,715 B2 * | 8/2016 | Chang | G02B 6/3853 |
| 2015/0117816 A1 * | 4/2015 | Lin | G02B 6/4214 385/33 |
| 2017/0357062 A1 * | 12/2017 | Watanabe | G02B 6/3865 |
| 2018/0120512 A1 * | 5/2018 | Nakama | G02B 6/382 |

FOREIGN PATENT DOCUMENTS

TW   103885140 B   5/2016

\* cited by examiner

*Primary Examiner* — Michelle R Connelly

(57) ABSTRACT

An optical communication module contains: a lens element, a fixer, and at least one optical fiber. The lens element includes a groove, a body, a top face, a light input face, at least one collimator lens, and a reflective bevel face. The at least one collimator lens is located within an orthographic projection range of a vertical viewing angle of the reflective bevel face, and the body has a light output face. The fixer is mounted beside the body and includes an accommodation recess and at least one focus face, wherein the at least one focus face corresponds to an orthographic projection range of a horizontal viewing angle of the light output face. The at least one optical fiber is inserted into the accommodation recess, and a glue is filled into the accommodation recess so that the at least one optical fiber is adhered in the lens element.

7 Claims, 7 Drawing Sheets

OPTICAL COMMUNICATION MODULE

FIELD OF THE INVENTION

The present invention relates to optical communication, and more particularly to an optical communication module which enhances connection tolerance.

BACKGROUND OF THE INVENTION

A conventional optical communication module is disclosed in CN Patent No. 103885140 as shown in FIG. 7, and the optical communication module contains a chip carrier 50 on which a photoelectric array 500 is arranged. The chip carrier 50 has a lens body 51 and a fixer 52, the lens body 51 has a reflection face 510 accommodated therein, a first array face 511 formed on a vertical surface of the lens body 51 relative to the reflection face 510, and the lens body 51 has a second array face 512 formed on a horizontal surface thereof with respect to the reflection face 510. The fixer 52 has a parallel optical fiber 520 relative to the first array face 511, and a light source is parallelized via the second array face 512 by using the reflection face 510 of the lens body 51, focuses on the first lens face 511, and moves into the parallel optical fiber 520 in multiple paths.

As the lens body 51 and the fixer 52 are connected together and the first array face 511 does not align with the parallel optical fiber 520, the efficiency of the optical communication module decreases, because air between the first array face 511 and the parallel optical fiber 520 causes scattering of the light source.

The present invention has arisen to mitigate and/or obviate the afore-described disadvantages.

SUMMARY OF THE INVENTION

The primary objective of the present invention is to provide an optical communication module which enhances its efficiency and improves configuration flexibility of the optoelectronic components on the circuit board.

To obtain the above objective, an optical communication module provided by the present invention contains: a lens element, a fixer, at least one optical fiber, and a circuit board.

The lens element includes a groove defined on one surface thereof, a body formed beside the groove of the lens element, a top face formed on a first surface of the body, a light input face defined on a second surface of the body away from the top face, at least one collimator lens located on the light input face, and a reflective bevel face formed on a first peripheral side of the body, wherein the at least one collimator lens is located within an orthographic projection range of a vertical viewing angle of the reflective bevel face, and the body has a light output face formed on a second peripheral side of the body opposite to the reflective bevel face.

The fixer is mounted beside the body and faces the light output face, the fixer includes an accommodation recess formed on a first surface of the fixer, and the fixer includes at least one focus face arranged in the fixer and facing the lens element, wherein the at least one focus face corresponds to an orthographic projection range of a horizontal viewing angle of the light output face.

The at least one optical fiber is inserted into the accommodation recess of the lens element, wherein a glue is filled into the accommodation recess of the lens element so that the at least one optical fiber is adhered in the lens element, and one end of the at least one optical fiber aligns with the at least one focus face.

In a preferred embodiment, the body of the lens element is the groove.

In a preferred embodiment, the reflective bevel face of the lens element has a main reflection part and an auxiliary reflection part.

In a preferred embodiment, the fixer also includes a stop face defined in the accommodation recess and facing the lens element, and the fixer includes at least one channel arranged on a second surface thereof away from the lens element, wherein the at least one optical fiber is inserted into the accommodation recess via the at least one channel, and one end of each of the at least one optical fiber contacts with the stop face.

In a preferred embodiment, a reflective index of the glue is within 1.45 to 1.65

In a preferred embodiment, the optical communication module further contains a circuit board on which the lens element is mounted.

In a preferred embodiment, the circuit board includes at least one optoelectronic component array, and the at least one optoelectronic component array is located within an orthographic projection range in a vertical direction of the reflective bevel face of the lens element.

In a preferred embodiment, the at least one optoelectronic component array is any one of at least one light emitting element, at least one light sensor, and a combination of the at least one light emitting element and the at least one light sensor.

In a preferred embodiment, a first angle $\theta_A$ is defined between the light input face and the main reflection part of the body and is within 45° to 54°, a second angle $\theta_C$ is defined between the light input face and the auxiliary reflection part and is within 67.5° to 81°, and a third angle $\theta_B$ is defined between the light input face and the light output face and is within 45° to 90°.

In a preferred embodiment, the at least one optoelectronic component array is at least one light emitting element and at least one light sensor, the at least one light emitting element is located within an orthographic projection range in a vertical direction of the main reflection part of the lens element, and the at least one light sensor is located within an orthographic projection range in a vertical direction of the auxiliary reflection part of the lens element.

DETAILED DESCRIPTION OF THE PREFERRED EMBODIMENTS

With reference to FIGS. 1-4, an optical communication module according to a preferred embodiment of the present invention comprises a lens element 10, a fixer 20, a circuit board 30, and at least one optical fiber 40.

Figure 1:
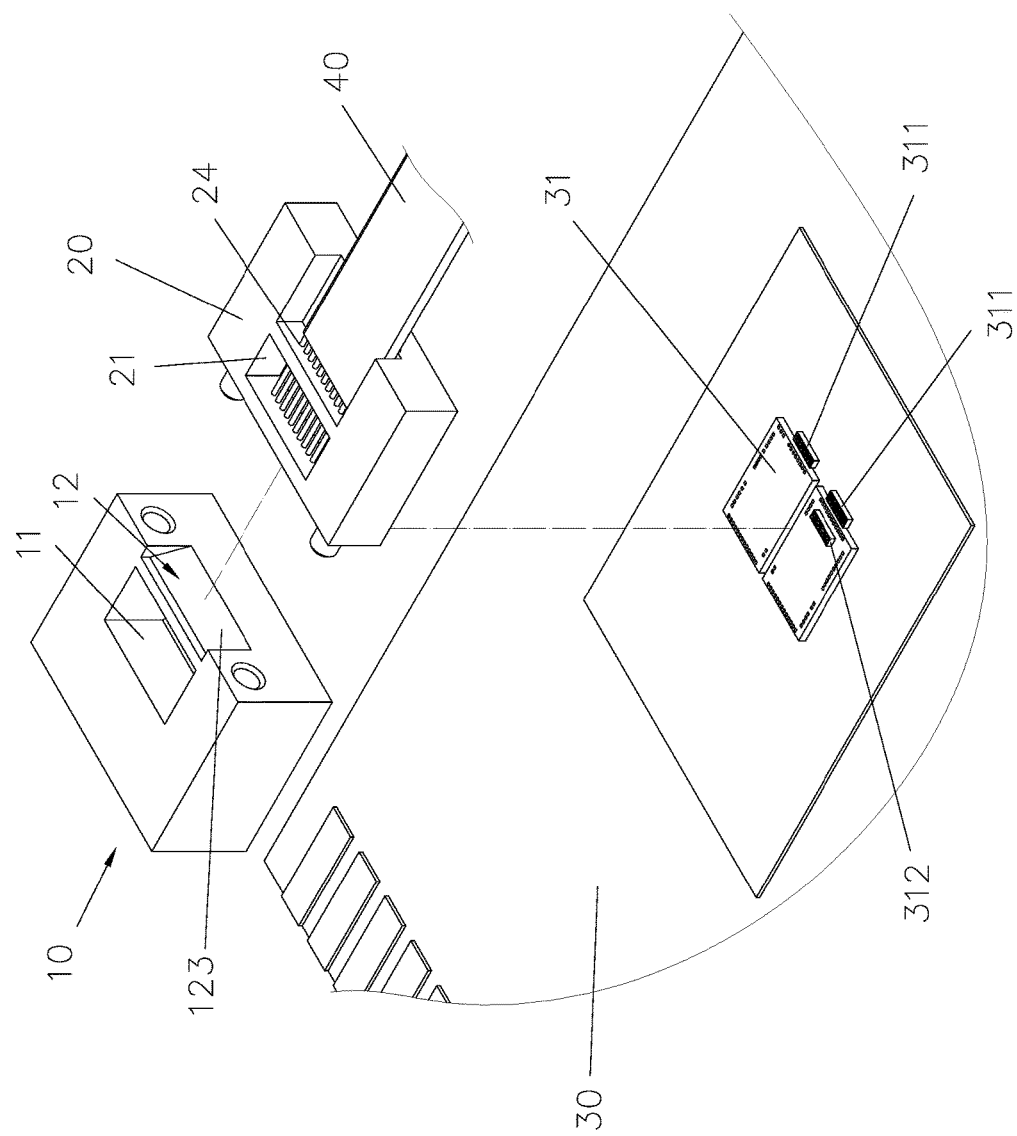
FIG. 1 is a perspective view showing the exploded components of an optical communication module and a circuit board according to a preferred embodiment of the present invention.
Figure 2:
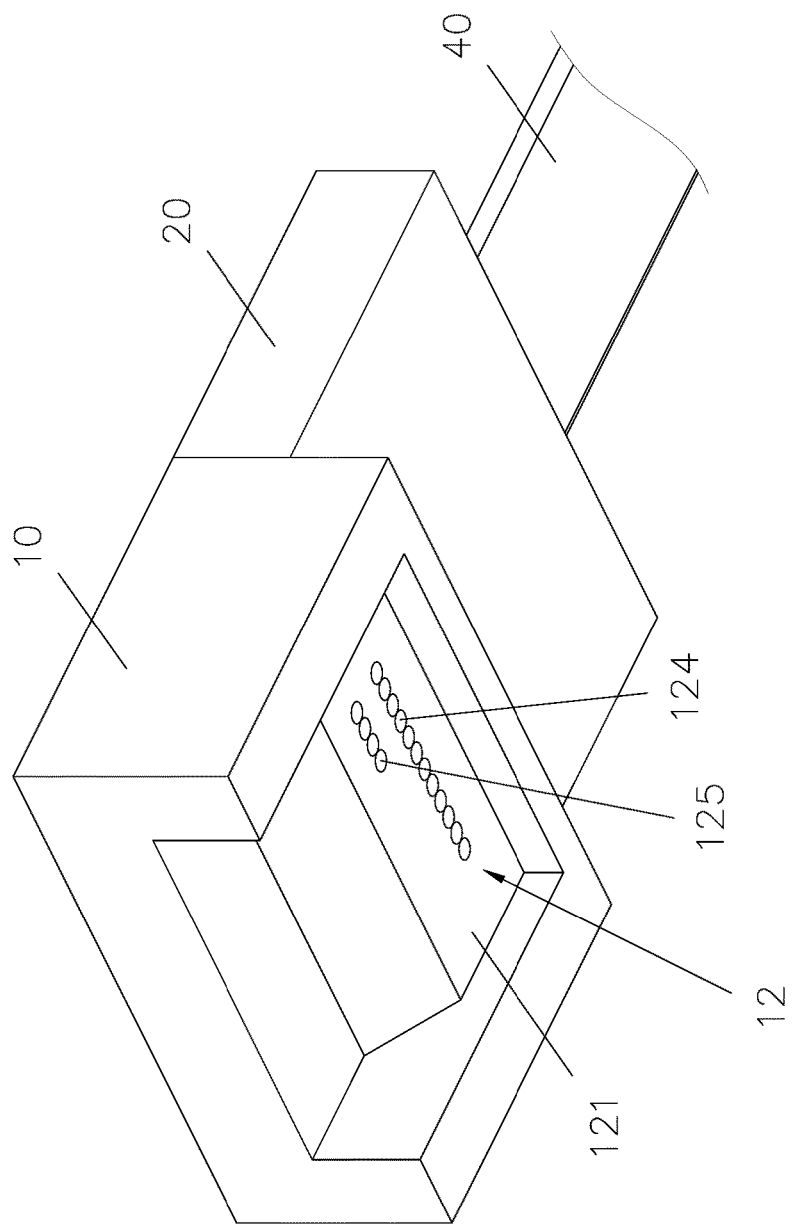
FIG. 2 is a perspective view showing the assembly of the optical communication module according to the preferred embodiment of the present invention.
Figure 3:
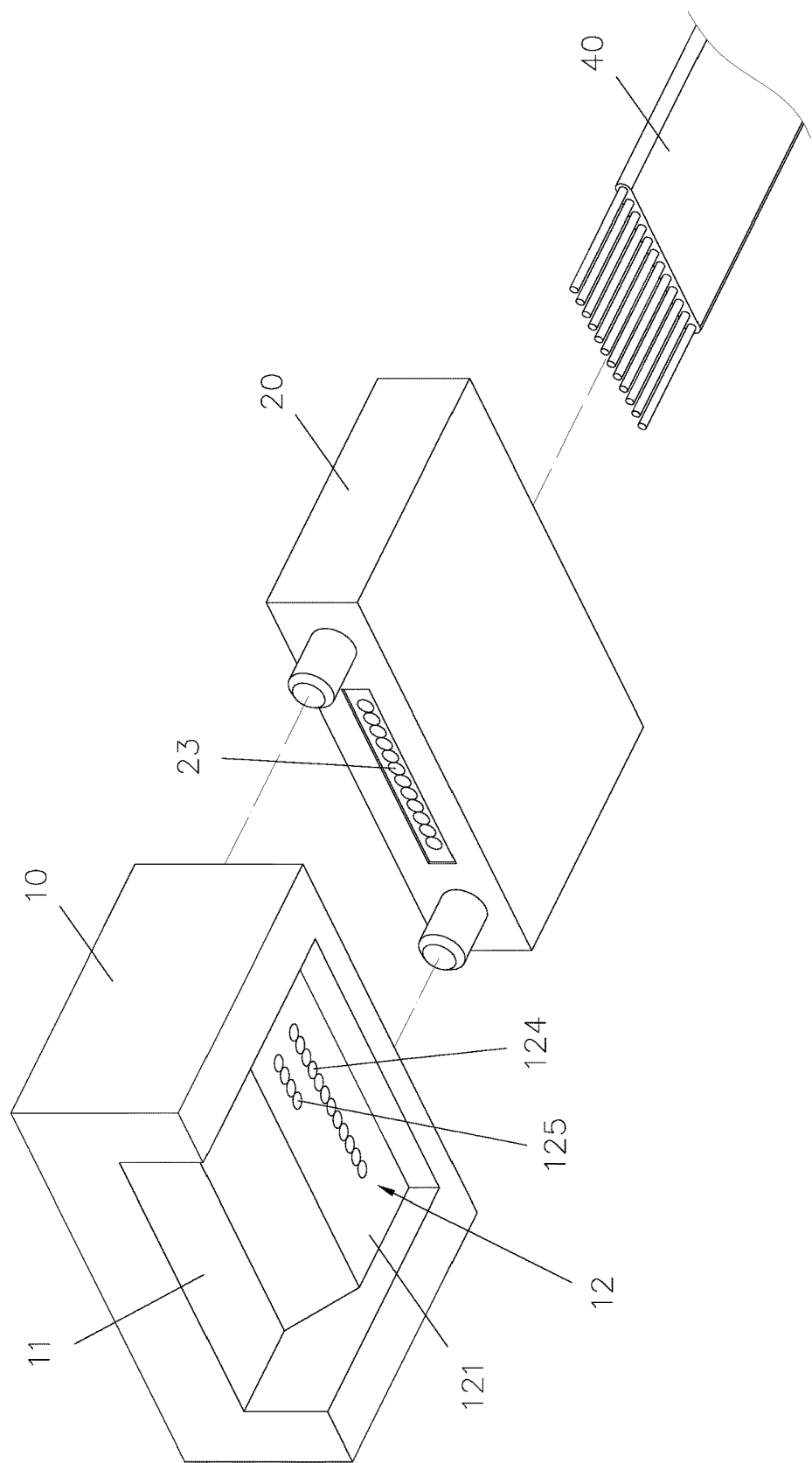
FIG. 3 is a perspective view showing the exploded components of the optical communication module according to the preferred embodiment of the present invention.
Figure 4:
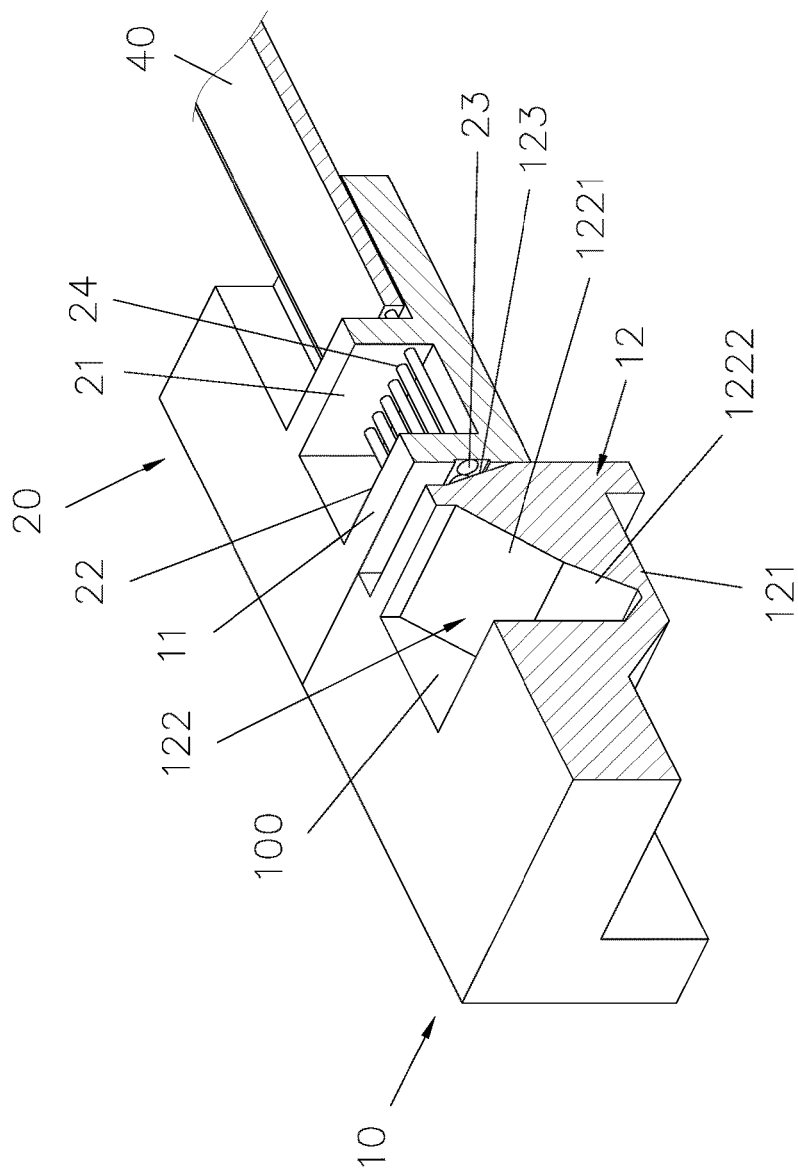
FIG. 4 is a cross-sectional perspective view showing the assembly of a part of the optical communication module according to the preferred embodiment of the present invention.
Figure 5:
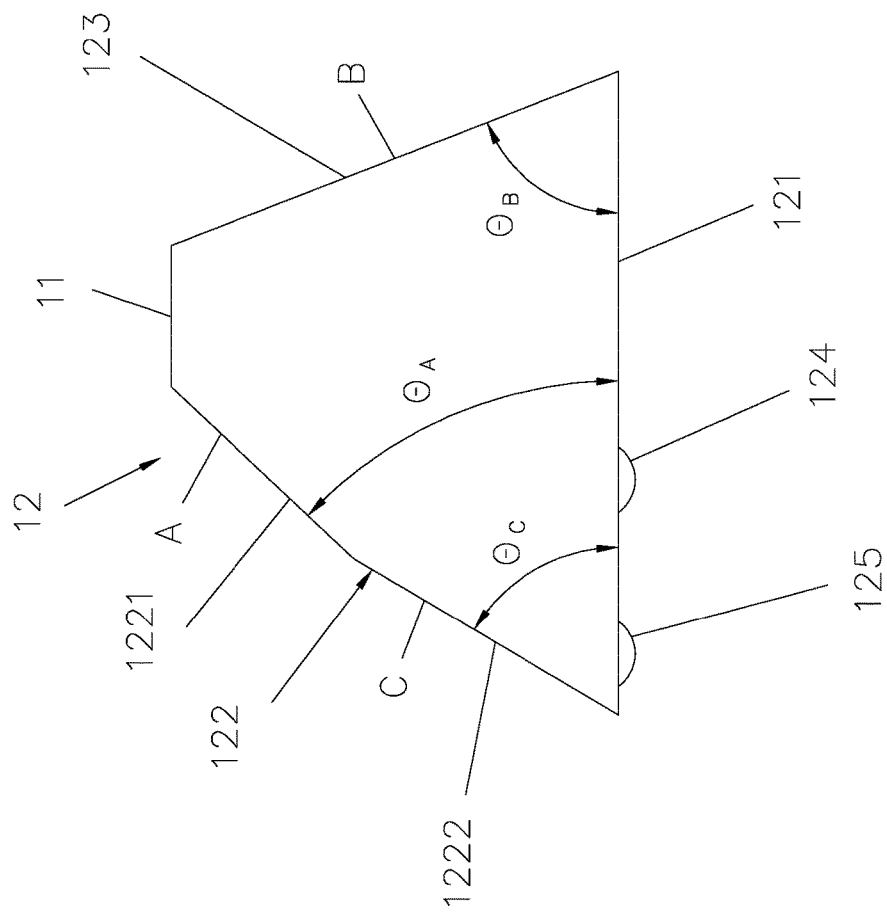
FIG. 5 is a cross sectional view of a part of a lens element of the optical communication module according to the preferred embodiment of the present invention.

Referring further to FIG. 5, the lens element 10 includes a groove 100 defined on one surface thereof, a body 12 formed beside the groove 100, a top face 11 formed on a first surface of the body 12, a light input face 121 defined on a second surface of the body 12 away from the top face 11, multiple collimator lenses 124 and multiple light receiving lenses 125 which are located on the light input face 121, and a reflective bevel face 122 formed on a first peripheral side of the body 12, wherein the reflective bevel face 122 has a main reflection part 1221 and an auxiliary reflection part 1222, and the main reflection part 1221 is located above or below the auxiliary reflection part 1222. In this embodiment, the main reflection part 1221 is located above the auxiliary reflection part 1222, the multiple collimator lenses 124 are located within an orthographic projection range of a vertical viewing angle of the main reflection part 1221 of the reflective bevel face 122, and the multiple light receiving lenses 125 are located within an orthographic projection range of a vertical viewing angle of the auxiliary reflection part 1222 of the reflective bevel face 122, wherein a first angle $\theta_A$ is defined between the light input face 121 and the main reflection part 1221 and is within 45° to 54°, a second angle $\theta_C$ is defined between the light input face 121 and the auxiliary reflection part 1222 and is within 67.5° to 81°. The body 12 has a light output face 123 formed on a second peripheral side of the body 12 opposite to the reflective bevel face 122, a third angle $\theta_B$ is defined between the light input face 121 and the light output face 123 and is within 45° to 90°.

Figure 6:
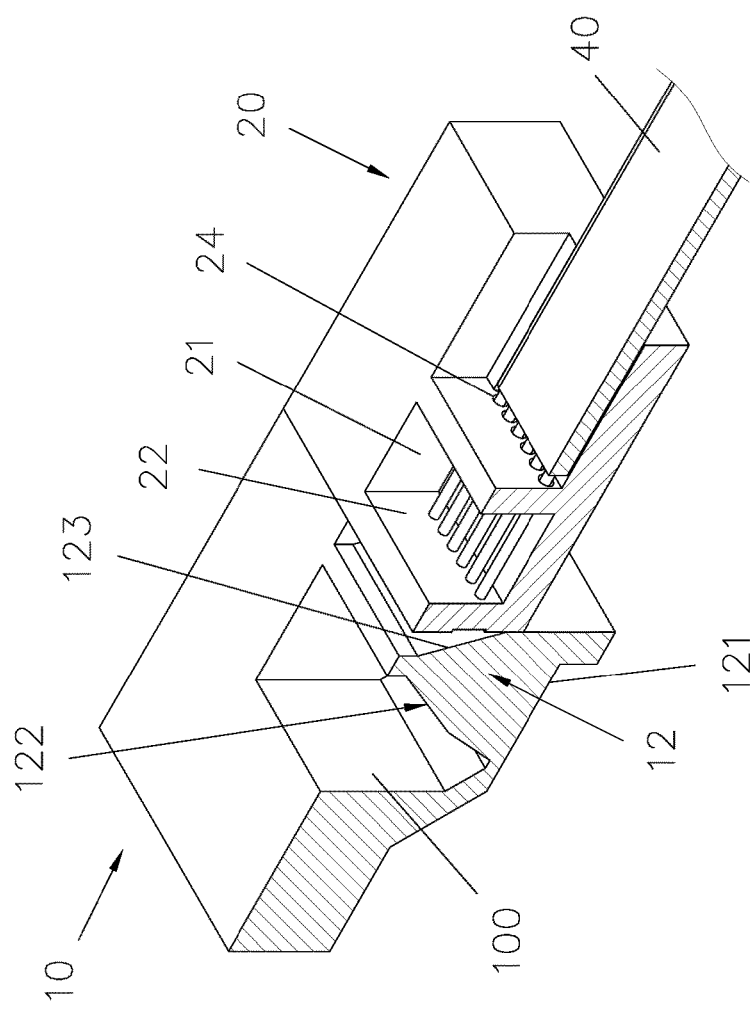
FIG. 6 is another cross-sectional perspective view showing the assembly of a part of the optical communication module according to the preferred embodiment of the present invention.
Figure 7:
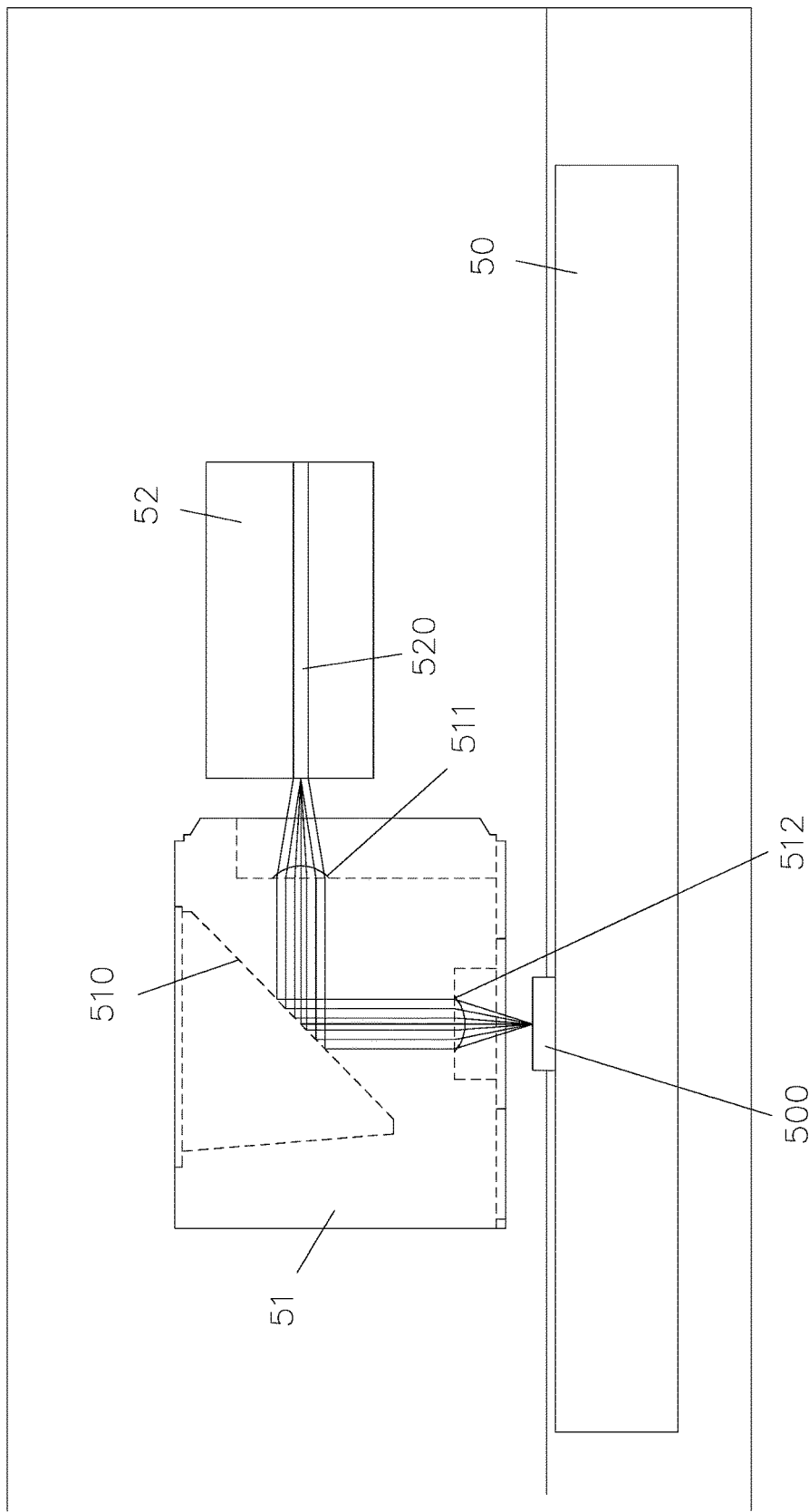
FIG. 7 is a side plan view of a conventional lens module.

As shown in FIG. 6, the fixer 20 is mounted beside the body 12 and facing the light output face 123, the fixer 20 includes an accommodation recess 21 formed on a first surface of the fixer 20, a stop face 22 defined in the accommodation recess 21 and facing the lens element 10, and at least one focus face 23 arranged in the fixer 20 and facing the lens element 10, wherein the at least one focus face 23 corresponds to an orthographic projection range of a horizontal viewing angle of the light output face 123 and is configured to focus lights on the at least one optical fiber 40 from the light output face 123. The fixer 20 further includes at least one channel 24 arranged on a second surface thereof away from the lens element 10, wherein a plurality of channels 24 are arranged on the second surface of the fixer 20 so that the at least one optical fiber 40 is inserted into the accommodation recess 21 via the plurality of channels 24, wherein one end of each of the at least one optical fiber 40 contacts with the stop face 22, and each optical fiber 40 is adhered in the accommodation recess 21 by way of a glue (not shown).

The lens element 10 and the fixer 20 are mounted on the circuit board 30, and the circuit board 30 includes multiple optoelectronic component arrays 31, and each of the multiple optoelectronic component arrays 31 is multiple light emitting elements 311, plural light sensors 312 or a combination of the multiple light emitting elements 311 and the plural light sensors 312. In this embodiment, each optoelectronic component array 31 is comprised of the combination of the multiple light emitting elements 311 and the plural light sensors 312, wherein the multiple light emitting elements 311 are located within an orthographic projection range in a vertical direction of the main reflection part 1221 of the lens element 10, and the plural light sensors 312 are located within an orthographic projection range in a vertical direction of the auxiliary reflection part 1222 of the lens element 10.

As illustrated in FIGS. 1-4, as connecting the lens element 10 and the fixer 20, the one end of each optical fiber 40 is inserted into the fixer 20 via each of the plurality of channels 24 so as to contact with the stop face 22, and the glue (not shown) is filled into the accommodation recess 21 so that each optical fiber 40 is adhered in the accommodation recess 21, thereafter the lens element 10 and the circuit board 30 are connected together.

It is to be noted that the glue has specific refractive index so as to decrease consumption of light energy between each optical fiber 40 and the stop face 22 because of a difference of refractive indexes of lens, optical fiber, and air, wherein a reflective index of the glue is within 1.45 to 1.65, and a parallel light source produces after the lights pass through the multiple collimator lenses 124. Thereafter, the parallel light source refracts via the main reflection part 1221 and enters into the at least one optical fiber 40 after focusing on the at least one focus face 23, thus enhancing connection tolerance of an optical system. Preferably, a connection tolerance of the at least one focus face 23 and the at least one optical fiber 40 is 0.08 mm, and the light source of the multiple light emitting elements 311 enters into the body 12 after being parallelized by the multiple collimator lenses 124. The light source of the multiple light emitting elements 311 is refracted via the main reflection part 1221 and is outputted out of the light output face 123, wherein a part of the light source is reflected to the at least one focus face 23 from the auxiliary reflection part 1222 after being reflected by the light output face 123, and the part of the light source irradiates onto the plural light sensors 312 after focusing on the at least one focus face 23.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An optical communication module comprising:
a lens element including a groove defined on one surface of the lens element, a body formed beside the groove of the lens element, a top face formed on a first surface of the body, a light input face defined on a second surface of the body away from the top face, at least one collimator lens located on the light input face, and a reflective bevel face formed on a first peripheral side of the body, wherein the at least one collimator lens is located within an orthographic projection range of a vertical viewing angle of the reflective bevel face, and the body has a light output face formed on a second peripheral side of the body opposite to the reflective bevel face; and the reflective bevel face of the lens element has a main reflection part and an auxiliary reflection part, wherein a first angle $\theta_A$ is defined between the light input face and the main reflection part of the body and is within 45° to 54°, a second angle $\theta_c$ is defined between the light input face and the auxiliary reflection part and is within 67.5° to 81°, and a third angle $\theta_B$ is defined between the light input face and the light output face and is within 45° to 90°;

a fixer mounted beside the body and facing the light output face, the fixer including an accommodation recess formed on a first surface of the fixer, and the fixer including at least one focus face arranged in the fixer and facing the lens element, wherein the at least one focus face corresponds to an orthographic projection range of a horizontal viewing angle of the light output face; and at least one optical fiber inserted into the accommodation recess of the fixer, wherein a glue is filled into the accommodation recess of the fixer so that the at least one optical fiber is adhered in the fixer, and one end of the at least one optical fiber aligns with the at least one focus face.

2. The optical communication module as claimed in claim 1, wherein the fixer also includes a stop face defined in the accommodation recess and facing the lens element, and the fixer includes at least one channel arranged on a second surface thereof away from the lens element, wherein the at least one optical fiber is inserted into the accommodation recess via the at least one channel, and one end of each of the at least one optical fiber contacts with the stop face.

3. The optical communication module as claimed in claim 1, wherein a reflective index of the glue is within 1.45 to 1.65.

4. The optical communication module as claimed in claim 1 further comprising a circuit board on which the lens element is mounted.

5. The optical communication module as claimed in claim 4, wherein the circuit board includes at least one optoelectronic component array, and the at least one optoelectronic component array is located within an orthographic projection range in a vertical direction of the reflective bevel face of the lens element.

6. The optical communication module as claimed in claim 5, wherein the at least one optoelectronic component array is any one of at least one light emitting element, at least one light sensor, and a combination of the at least one light emitting element and the at least one light sensor.

7. The optical communication module as claimed in claim 5, wherein the at least one optoelectronic component array is at least one light emitting element and at least one light sensor, the at least one light emitting element is located within an orthographic projection range in a vertical direction of the main reflection part of the lens element, and the at least one light sensor is located within an orthographic projection range in a vertical direction of the auxiliary reflection part of the lens element.

* * * * *